(12) United States Patent
Kessler

(10) Patent No.: US 12,697,793 B2
(45) Date of Patent: Aug. 4, 2026

(54) METHOD FOR PRODUCING A FLEXIBLE COMPOSITE PIPE, AND THERMOPLASTIC COMPOSITE PIPE

(71) Applicant: Fibron Pipe GESMBH, St. Valentin (AT)

(72) Inventor: Andreas Kessler, Pullach im Isartal (DE)

(73) Assignee: Fibron Pipe GESMBH, St. Valentin (AT)

( * ) Notice: Subject to any disclaimer, the term of this patent is extended or adjusted under 35 U.S.C. 154(b) by 0 days.

(21) Appl. No.: 18/857,132

(22) PCT Filed: Apr. 4, 2023

(86) PCT No.: PCT/EP2023/058761
§ 371 (c)(1),
(2) Date: Oct. 15, 2024

(87) PCT Pub. No.: WO2023/198510
PCT Pub. Date: Oct. 19, 2023

(65) Prior Publication Data
US 2025/0170793 A1 May 29, 2025

(30) Foreign Application Priority Data
Apr. 12, 2022 (DE) .................................... 22167831

(51) Int. Cl.
*B29D 23/00* (2006.01)
*B29C 53/58* (2006.01)
(Continued)

(52) U.S. Cl.
CPC ............ *B29D 23/001* (2013.01); *B29C 53/58* (2013.01); *B32B 1/08* (2013.01); *B32B 5/26* (2013.01);
(Continued)

(58) Field of Classification Search
CPC ......... B29D 23/001; B29C 53/58; B32B 1/08; B32B 5/26; B32B 27/32; B32B 27/34;
(Continued)

(56) References Cited

U.S. PATENT DOCUMENTS

| 3,654,967 A | 4/1972 | Atwell |
| 5,893,956 A | 4/1999 | Perry, Jr. |
| (Continued) | | |

FOREIGN PATENT DOCUMENTS

| DE | 102011017328 A1 | 10/2012 |
| WO | 9507428 W | 3/1995 |
| (Continued) | | |

*Primary Examiner* — David R Deal

(57) ABSTRACT

A method for producing a flexible thermoplastic composite pipe, wherein the method comprises the following steps: applying a first ply of a reinforcing layer onto a plastics pipe; consolidating the first ply of the reinforcing layer with the plastics pipe, wherein at least the first ply of the reinforcing layer is brought to a first temperature which leads to at least partial melting of the first ply of the reinforcing layer, such that the first ply of the reinforcing layer and the plastics pipe are rigidly interconnected, in particular in a fused manner; applying a second ply of the reinforcing layer onto the first ply of the reinforcing layer; consolidating the second ply of the reinforcing layer with at least the first ply of the reinforcing layer, wherein at least the second ply of the reinforcing layer is brought to a second temperature which leads to at least partial melting of the second ply of the reinforcing layer, such that the second ply of the reinforcing layer and the first ply of the reinforcing layer are rigidly interconnected, in particular in a fused manner; applying at least a third ply of the reinforcing layer onto the second ply of the reinforcing layer; consolidating the at least one third ply of the reinforcing layer with at least the second ply of the reinforcing layer, wherein at least the third ply of the reinforcing layer is brought to a third temperature which (Continued)

leads to at least partial melting of the third ply of the reinforcing layer, such that the third ply of the reinforcing layer and the second ply of the reinforcing layer are rigidly interconnected, in particular in a fused manner, and thermoplastic composite pipe and the use of a thermoplastic composite pipe.

20 Claims, 3 Drawing Sheets

(51) Int. Cl.
| | |
|---|---|
| *B32B 1/08* | (2006.01) |
| *B32B 5/26* | (2006.01) |
| *B32B 27/32* | (2006.01) |
| *B32B 27/34* | (2006.01) |
| *F16L 9/128* | (2006.01) |

(52) U.S. Cl.
CPC .............. *B32B 27/32* (2013.01); *B32B 27/34* (2013.01); *F16L 9/128* (2013.01); *B32B 2260/023* (2013.01); *B32B 2260/046* (2013.01); *B32B 2262/0269* (2013.01); *B32B 2262/101* (2013.01); *B32B 2262/106* (2013.01); *B32B 2597/00* (2013.01)

(58) Field of Classification Search
CPC ........ B32B 2260/023; B32B 2260/046; B32B 2262/0269; B32B 2262/101; B32B 2262/106; B32B 2597/00
USPC ......................................................... 138/137
See application file for complete search history.

(56) References Cited

U.S. PATENT DOCUMENTS

| | | | | |
|---|---|---|---|---|
| 2003/0213556 A1* | 11/2003 | Blackmore | ............... | E03F 3/06 |
| | | | | 156/380.5 |
| 2008/0233318 A1 | 9/2008 | Coyle | | |
| 2008/0254281 A1* | 10/2008 | Chen | ...................... | B32B 27/32 |
| | | | | 428/335 |
| 2010/0147446 A1* | 6/2010 | Ciolczyk | ................ | B29C 65/08 |
| | | | | 156/244.11 |
| 2011/0281052 A1* | 11/2011 | Dewhirst | ............. | B29D 23/001 |
| | | | | 428/36.9 |
| 2012/0048455 A1* | 3/2012 | Rocher | ..................... | F16L 9/12 |
| | | | | 156/190 |
| 2013/0269819 A1* | 10/2013 | Ruby | ..................... | B65D 25/14 |
| | | | | 156/172 |
| 2014/0044965 A1 | 2/2014 | Linow | | |
| 2014/0238977 A1 | 8/2014 | Dyksterhouse | | |
| 2016/0069484 A1* | 3/2016 | Jha | ............................ | F16L 1/14 |
| | | | | 156/149 |
| 2019/0329486 A1* | 10/2019 | Goulet | ...................... | D02G 3/22 |
| 2022/0275888 A1* | 9/2022 | Carney | ................... | B32B 27/08 |
| 2023/0021569 A1* | 1/2023 | Iio | ............................ | B29C 43/36 |
| 2024/0084932 A1* | 3/2024 | Rastogi | ................... | B32B 27/32 |
| 2024/0377002 A1* | 11/2024 | Traidia | ............... | F16L 58/1045 |

FOREIGN PATENT DOCUMENTS

| | | | |
|---|---|---|---|
| WO | 2008115857 A1 | 9/2008 | |
| WO | 2010026749 A1 | 3/2010 | |
| WO | 2017048117 A1 | 3/2017 | |

* cited by examiner

1

METHOD FOR PRODUCING A FLEXIBLE COMPOSITE PIPE, AND THERMOPLASTIC COMPOSITE PIPE

This application is a national stage application of PCT Patent Appln. No. PCT/EP2023/058761 filed Apr. 4, 2023, which claims priority to EP Patent Appln. No. 22167831.1 filed Apr. 12, 2022, which are herein incorporated by reference.

BACKGROUND OF THE INVENTION

1. Technical Field

The invention relates to a method for producing a flexible, thermoplastic composite pipe. The invention also relates to a thermoplastic composite pipe. The invention moreover relates to a use of a thermoplastic composite pipe.

2. Background Information

Flexible composite pipes are often fiber-reinforced plastics pipes that are used to transport various media, such as water, oil or gas, for example, for onshore or offshore production for transport on land or above the seabed. Flexible, thermoplastic composite pipes are also used in district heating pipeline construction to transport media for water and heating supply systems. Thermoplastic composite pipes (TCP) have, in particular a high resistance to pressure with working pressures between 40 and 300 bar and thus enable the medium to be transported over long distances.

Thermoplastic composite pipes usually have an inner layer consisting of a single or multi-layer inner liner made of thermoplastic material. A composite layer is applied to this thermoplastic material, for example, by winding on fiber-reinforced tapes. Composite pipes of this type are known, for example, from document WO 95/07428 A1 or WO 2017/048117 A1.

SUMMARY OF THE INVENTION

The invention is based on the task of structurally and/or functionally improving an above-mentioned method for producing a flexible, thermoplastic composite pipe. The invention is moreover based on the task of structurally and/or functionally improving an above-mentioned composite pipe.

The task is solved by a method for producing a flexible, thermoplastic composite pipe having the features of claim 1. The task is moreover solved by a thermoplastic composite pipe comprising a plastics pipe as an inner pipe and/or liner, and a reinforcing layer arranged around the plastics pipe. Advantageous embodiments and/or further developments are the subject of the subclaims.

A method may be and/or serve for producing a composite pipe, in particular a thermoplastic composite pipe. The composite pipe may be a flexible and/or bendable thermoplastic composite pipe. The composite pipe may be configured for transporting different media, such as liquid or gaseous media, such as water, for example, heating water, cooling water or drinking water, oil, for example, crude oil or petroleum, gas, for example, crude gas or natural gas, oil-water mixture and/or oil-gas mixture. The composite pipe may be configured for use in water, oil or gas networks or respectively water, oil or gas pipelines. The composite pipe may be configured for use in onshore or offshore production or respectively onshore or offshore transportation for transporting a medium on land or above the seabed.

The composite pipe may comprise and/or be produced with a reinforcing layer. The reinforcing layer may comprise and/or be formed or respectively produced from a plurality of plies. The plurality of plies may respectively comprise and/or be formed of or respectively be produced from at least one reinforcing belt, for example, two reinforcing belts.

The method may comprise the step of: producing, for example, extruding or pultruding, a plastics pipe. The plastics pipe may be a thermoplastic plastics pipe. The plastics pipe may be a base pipe, inner pipe, liner and/or inner liner. The composite pipe and/or the plastics pipe may be a non-metallic pipe. The plastics pipe may be or may be produced, for example, extruded or pultruded, from a thermoplastic material. The thermoplastic material may be or comprise polyolefin, polyethylene, high density polyethylene (HDPE), polypropylene or polyamide. The plastics pipe may be or will be produced by means of an extrusion process or pultrusion process. For example, the plastics pipe may be or will be produced or respectively extruded using an extruder and/or a pipe head.

The method may comprise the step of: providing the plastics pipe. Providing the plastics pipe may comprise winding and/or unwinding the plastics pipe, for example, onto or respectively from a drum device. The winding and/or unwinding may be performed by means of at least one pull-roll. The at least one pull-roll may be a belt puller.

The method may comprise the step of: warming in advance and/or pre-heating the plastics pipe and/or its pipe body surface, for example, to a pre-heating temperature. The warming in advance and/or pre-heating may be performed by means of a pre-heating apparatus, for example, a pre-heating oven, such as an infrared pre-heating oven.

The method may comprise the step of: applying a first ply of a reinforcing layer onto the plastics pipe. The application may be or include a winding, as a wrapping. The winding may be or comprise a spiral-shaped and/or helical-shaped wrapping.

The first ply of the reinforcing layer may comprise a first reinforcing belt. The first reinforcing belt of the first ply of the reinforcing layer may be wound around the plastics pipe in a substantially spiral shape and/or helical shape in a first spiral-shaped and/or helical-shaped direction, as first winding direction. For example, the first reinforcing belt of the first ply of the reinforcing layer may be wound in a substantially spiral shape in the first spiral-shaped direction, as first winding direction, around the plastics pipe such as to form a plurality of axially spaced belt sections and gaps or respectively splits between them.

The first ply of the reinforcing layer may comprise a second reinforcing belt. The second reinforcing belt of the first ply of the reinforcing layer may be wound around the plastics pipe in a substantially spiral shape and/or helical shape in the first spiral-shaped and/or helical-shaped direction, as first winding direction. For example, the second reinforcing belt of the first ply of the reinforcing layer may be wound in a substantially spiral shape in the first spiral-shaped direction, as first winding direction, around the plastics pipe such that a plurality of axially spaced belt sections arises, which are arranged in the gaps or respectively splits of the first reinforcing belts of the first ply of the reinforcing layer. The first reinforcing belt of the first ply of the reinforcing layer and the second reinforcing belt of the first ply of the reinforcing layer may be wound around the plastics pipe substantially simultaneously or, for example, immediately one after the other.

The winding or respectively the wrapping may be carried out, for example, by means of a two-coil winding device, such as a taping machine. The winding or respectively the wrapping may be carried out with a first tensile stress, in particular a predefined tensile stress. The first reinforcing belt of the first ply of the reinforcing layer and the second reinforcing belt of the first ply of the reinforcing layer may be arranged, in particular in the axial direction, directly and/or immediately adjacent to one another, in particular substantially edge to edge, and/or not overlapping. The first reinforcing belt of the first ply of the reinforcing layer and the second reinforcing belt of the first ply of the reinforcing layer can, in particular in the axial direction, be arranged substantially edge to edge and/or without joint. The first ply of the reinforcing layer may be a single application, such as a monolayer application, or respectively may be produced/realized as a single application.

The method may comprise the step of: consolidating the first ply of the reinforcing layer with the plastics pipe. The consolidation may comprise the warming and/or heating up of the first ply of the reinforcing layer and/or of the plastics pipe, in particular the pipe body surface thereof. The consolidation may include bonding, for example, fusion bonding and/or fusing, of the first ply of the reinforcing layer onto the plastics pipe. Such a bonding may also be referred to as "rigidly bonded" and/or "bonded", such as "fully bonded".

At least the first ply of the reinforcing layer may be brought to a first temperature. The first ply of the reinforcing layer and the plastics pipe, for example, the pipe body surface thereof, may be brought to the first temperature. The first temperature may be a predefined and/or predetermined temperature. The first temperature may be the temperature of the first ply of the reinforcing layer and/or of the plastics pipe, for example, the pipe body surface thereof. The first temperature can lead to at least a partial melting of the first ply of the reinforcing layer, in particular such that the first ply of the reinforcing layer and the plastics pipe are rigidly interconnected, for example, in a fused manner. The first temperature can moreover lead to at least partial melting of the plastics pipe, for example, pipe body surface thereof.

The consolidation or respectively the warming up and/or the heating of the first ply of the reinforcing layer and/or the plastics pipe may be carried out by thermal radiation. The consolidation or respectively the warming up and/or heating of the first ply of the reinforcing layer and/or the plastics pipe may be carried out by means of a first heating apparatus. The first heating apparatus may be a radiant warmer or respectively a radiant heater and/or an infrared heating apparatus, such as an infrared oven. The consolidation or respectively the warming up and/or the heating can take place with a tolerance of approximately 1 to 5° C., preferably approximately 1 to 2° C. The consolidation or respectively warming up and/or heating may be carried out about an angular range of 360° or respectively around the entire circumference, in particular of the first ply of the reinforcing layer and/or of the plastics pipe. The first ply of the reinforcing layer and/or the plastics pipe may be irradiated, such as heat irradiated, about at an angular range of 360°. The first heating apparatus may be a 360° radiant warmer and/or radiant heater. The plastics pipe may be passed through the first heating apparatus together with the first ply of the reinforcing layer. In particular the plastics pipe wrapped with the first ply of the reinforcing layer may be passed through the first heating apparatus.

The method may comprise the step of: applying a second ply of the reinforcing layer onto the first ply of the reinforcing layer. The application may be or comprise a winding, such as a wrapping. The winding may be or comprise a spiral-shaped and/or helical-shaped wrapping.

The second ply of the reinforcing layer may comprise a first reinforcing belt. The first reinforcing belt of the second ply of the reinforcing layer may be wound around the first ply of the reinforcing layer in a substantially spiral shape and/or helical shape in a second spiral-shaped and/or helical-shaped direction, as second winding direction. For example, the first reinforcing belt of the second ply of the reinforcing layer may be wound in a substantially spiral shape in the second spiral-shaped direction, as second winding direction, around the first ply of the reinforcing layer such that a plurality of axially spaced belt sections and gaps or respectively splits between the sections are formed.

The second ply of the reinforcing layer may comprise a second reinforcing belt. The second reinforcing belt of the second ply of the reinforcing layer may be wound around the first ply of the reinforcing layer in a substantially spiral shape and/or helical shape in the second spiral-shaped direction, as second winding direction. For example, the second reinforcing belt of the second ply of the reinforcing layer may be wound around the first ply of the reinforcing layer in a substantially spiral shape in the second spiral-shaped direction, as the second winding direction, such that a plurality of axially spaced belt sections is formed, which sections are arranged in the gaps or respectively splits of the first reinforcing belt of the second ply of the reinforcing layer. The first reinforcing belt of the second ply of the reinforcing layer and the second reinforcing belt of the second ply of the reinforcing layer may be wound around the first ply of the reinforcing layer substantially simultaneously or, for example, immediately one after the other.

The winding or respectively the wrapping may be carried out, for example, by means of a two-coil winding device, such as a taping machine. The winding or respectively the wrapping may be carried out with a tensile stress, in particular a predefined second tensile stress. The first tensile stress and the second tensile stress may be the same or different. The first tensile stress may be greater or lesser than the second tensile stress. The second spiral-shaped direction or respectively second winding direction may be substantially opposite to the first spiral-shaped direction or respectively first winding direction. The first reinforcing belt of the second ply of the reinforcing layer and the second reinforcing belt of the second ply of the reinforcing layer may be arranged, in particular in the axial direction, directly and/or immediately adjacent to one another, in particular substantially edge to edge, and/or in a non-overlapping manner. The first reinforcing belt of the second ply of the reinforcing layer and the second reinforcing belt of the second ply of the reinforcing layer may be arranged, in particular in the axial direction, substantially edge to edge and/or without joint. The second ply of the reinforcing layer may be a single application, such as a monolayer application, or respectively may be produced/realized as a single application.

The method may comprise the step of: consolidating the second ply of the reinforcing layer with at least the first ply of the reinforcing layer. In so doing, the second ply of the reinforcing layer may be consolidated with the first ply of the reinforcing layer and with the plastics pipe. The consolidation may comprise the warming up and/or heating of the second ply of the reinforcing layer and/or the first ply of the reinforcing layer. The consolidation may moreover also comprise the warming up and/or heating of the plastics pipe, in particular the pipe body surface thereof. The consolidation may comprise the bonding, for example, fusion bonding and/or fusing, of the second ply of the reinforcing layer onto the first ply of the reinforcing layer. Such a bonding may also be referred to as "rigidly bonded" and/or "bonded", such as "fully bonded".

At least the second ply of the reinforcing layer may be brought to a second temperature. The second ply of the reinforcing layer and the first ply of the reinforcing layer may be brought to the second temperature. In addition, the plastics pipe, for example, its pipe body surface, may be brought to the second temperature. The second temperature may be a predefined and/or predetermined temperature. The second temperature may be the temperature of the second ply of the reinforcing layer and/or of the first ply of the reinforcing layer and/or of the plastics pipe, for example, the pipe body surface thereof. The second temperature can lead to at least a partial melting of the second ply of the reinforcing layer, in particular such that the second ply of the reinforcing layer and the first ply of the reinforcing layer are rigidly interconnected, for example, in a fused manner. The second temperature can moreover lead to at least partial melting of the first ply of the reinforcing layer and/or of the plastics pipe. The first temperature and the second temperature may be substantially the same. Alternatively, the first temperature and the second temperature may be different. The first temperature may be greater than or lesser than the second temperature.

The consolidation or respectively the warming up and/or the heating of the second ply of the reinforcing layer and/or the first ply of the reinforcing layer may be carried out by thermal radiation. The consolidation or respectively the warming up and/or the heating of the second ply of the reinforcing layer and/or the first ply of the reinforcing layer may be carried out by means of a second heating apparatus. The second heating apparatus may be a radiant warmer or respectively a radiant heater and/or an infrared heating apparatus, such as an infrared oven. The consolidation or respectively the warming up and/or the heating can take place with a tolerance of approximately 1 to 5° C., preferably approximately 1 to 2° C. The consolidation or respectively warming up and/or heating may be carried out about an angular range of 360° or respectively around the entire circumference, in particular of the second ply of the reinforcing layer and/or of the first ply of the reinforcing layer and/or of the plastics pipe. The second ply of the reinforcing layer and/or first ply of the reinforcing layer may be irradiated, such as heat irradiated, about an angular range of 360°. The second heating apparatus may be a 360° radiant warmer and/or radiant heater. The plastics pipe may be passed through the second heating apparatus together with the first ply of the reinforcing layer and the second ply of the reinforcing layer. In particular the plastics pipe wrapped with the second ply of the reinforcing layer may be passed through the second heating apparatus.

The method may comprise the step of: applying at least a third ply of the reinforcing layer onto the second ply of the reinforcing layer. The application may be or comprise a winding, such as a wrapping. The winding may be or comprise a spiral-shaped and/or helical-shaped wrapping.

The third ply of the reinforcing layer may comprise a first reinforcing belt. The first reinforcing belt of the third ply of the reinforcing layer may be wound around the second ply of the reinforcing layer in a substantially spiral shape and/or helical shape in a third spiral-shaped and/or helical-shaped direction, as third winding direction. The third ply of the reinforcing layer may comprise a second reinforcing belt. The second reinforcing belt of the third ply of the reinforcing layer may be wound around the second ply of the reinforcing layer in a substantially spiral shape and/or helical shape in the third spiral-shaped and/or helical-shaped direction, as third winding direction. For example, the second reinforcing belt of the third ply of the reinforcing layer may be wound around the second ply of the reinforcing layer in a substantially spiral shape in the third spiral-shaped direction, as third winding direction, such that the second reinforcing belt of the third ply of the reinforcing layer and the first reinforcing belt of the third ply of the reinforcing layer overlap in sections. The first reinforcing belt of the third ply of the reinforcing layer and the second reinforcing belt of the third ply of the reinforcing layer may have an overlapping area or respectively may be wound around the second ply of the reinforcing layer such that they form an overlapping area. The overlapping area may be or be formed substantially over the seam and/or substantially adjacent edges of the first and/or of second ply of the reinforcing layer. The overlap may amount to approximately 10% to 70%, for example, approximately 40% to 60%, preferably approximately 50%, in particular the width of the belt. When speaking of the width of the belt, this may be the width of the belt of the first and/or second reinforcing belt of the third ply of the reinforcing layer. The at least one third ply of the reinforcing layer may be a double application, as double layer application, or respectively may be produced/realized as a double application.

The first reinforcing belt of the third ply of the reinforcing layer and the second reinforcing belt of the third ply of the reinforcing layer may be wound around the second ply of the reinforcing layer substantially simultaneously or, for example, immediately, one after the other.

The winding or respectively the wrapping may be carried out, for example, by means of a two-coil or four-coil winding device, such as a taping machine. The winding or respectively the wrapping may be carried out with a third tensile stress, in particular a predefined tensile stress. The third tensile stress and the first tensile stress may be the same or different. The third tensile stress and the second tensile stress may be the same or different. The third tensile stress may be greater or lesser than the first and/or the second tensile stress. For example, the third tensile stress may be approximately twice as great as the first and/or second tensile stress. The third spiral-shaped direction or respectively the third winding direction may substantially correspond to the first spiral-shaped direction or respectively the first winding direction or substantially correspond to the second spiral-shaped direction or respectively the second winding direction.

The first reinforcing belt of the first ply of the reinforcing layer and/or the second reinforcing belt of the first ply of the reinforcing layer and/or the first reinforcing belt of the second ply of the reinforcing layer and/or the second reinforcing belt of the second ply of the reinforcing layer and/or the first reinforcing belt of the third ply of the reinforcing layer and/or the second reinforcing belt of the third ply of the reinforcing layer may comprise or respectively be a reinforcing belt comprising fibers impregnated and/or coated with plastics. The plastics may be a thermoplastic material. The plastics may, for example, be or comprise polyolefin, polyethylene, high-density polyethylene (HDPE), polypropylene or polyamide. The fibers may be or may eventually be arranged and/or aligned unidirectionally. The fibers may be or comprise glass fibers and/or plastics fibers and/or carbon fibers and/or aramid fibers and/or basalt fibers and/or ceramic fibers. The cross-section of the fibers may be circular, rectangular, oval, elliptical or cocoon-shaped. The fibers may be configured of short fibers, long fibers or continuous fibers. The fibers may be configured as or become fiber strands. The fibers may be configured and/or arranged as or become a woven or knit fabric or with a unidirectional fiber layer. The first and/or second and/or third ply made out of the reinforcing belt may also be referred to as tape, such as fiber-reinforced tape. The first and/or second and/or third ply made out of the reinforcing belt may be or may eventually be produced by, for example, an impregnation process, a melt application process, a melt impregnation process, a powder impregnation process or a pultrusion process.

The method may comprise the step of: consolidating the at least one third ply of the reinforcing layer with at least the second ply of the reinforcing layer. In so doing, the at least one third ply of the reinforcing layer may be consolidated with the second ply of the reinforcing layer and with the first ply of the reinforcing layer. The at least one third ply of the reinforcing layer may moreover be consolidated with the second ply of the reinforcing layer, with the first ply of the reinforcing layer and with the plastics pipe. The consolidation may comprise the warming up and/or the heating of the third ply of the reinforcing layer and/or the second ply of the reinforcing layer. The consolidation may moreover comprise the warming up and/or the heating the first ply of the reinforcing layer. The consolidation may moreover also comprise the warming up and/or the heating the plastics pipe, in particular the pipe body surface thereof. The consolidation may comprise bonding, for example, fusion bonding and/or fusing, of the third ply of the reinforcing layer with the second ply of the reinforcing layer. Such bonding may also be referred to as "rigidly bonded" and/or "bonded", such as "fully bonded".

At least the third ply of the reinforcing layer may be brought to a third temperature. The third ply of the reinforcing layer and the second ply of the reinforcing layer may be brought to the third temperature. The first ply of the reinforcing layer and/or the plastics pipe, for example, the pipe body surface thereof, may moreover be brought to the third temperature. The third temperature may be a predefined and/or predetermined temperature. The third temperature may be the temperature of the third ply of the reinforcing layer and/or of the second ply of the reinforcing layer and/or the first ply of the reinforcing layer and/or the plastics pipe, for example, the pipe body surface thereof. The third temperature can lead to an at least partial melting of the third ply of the reinforcing layer, in particular such that the third ply of the reinforcing layer and the second ply of the reinforcing layer are rigidly interconnected, in particular in a fused manner. The third temperature can moreover lead to an at least partial melting of the second ply of the reinforcing layer and/or of the first ply of the reinforcing layer and/or of the plastics pipe. The third temperature and the first and/or second temperature may be different. The third temperature may be greater than the first and/or second temperature.

The consolidation or respectively the warming up and/or the heating of the third ply of the reinforcing layer and/or of the second ply of the reinforcing layer may be performed by thermal radiation. The consolidation or respectively the warming up and/or the heating of the third ply of the reinforcing layer and/or of the second ply of the reinforcing layer may be carried out by means of a third heating apparatus. The third heating apparatus may be a radiant warmer or respectively a radiant heater and/or an infrared heating apparatus, such as an infrared oven. The consolidation or respectively the warming up and/or the heating can take place with a tolerance of approximately 1 to 5° C., preferably approximately 1 to 2° C. The consolidation or respectively the warming up and/or the heating may be carried out about an angular range of 360° or respectively around the entire circumference, in particular of the third ply of the reinforcing layer and/or of the second ply of the reinforcing layer and/or of the plastics pipe. The third ply of the reinforcing layer and/or the second ply of the reinforcing layer may be irradiated, such as heat irradiated, about an angular range of 360°. The third heating apparatus may be a 360° radiant warmer and/or radiant heater. The plastics pipe may be passed through the third heating apparatus together with the first ply of the reinforcing layer, the second ply of the reinforcing layer and the third ply of the reinforcing layer. In particular the plastics pipe wrapped with the third ply of the reinforcing layer may be passed through the third heating apparatus.

In the method, a plurality of, for example, two, three, four, five, six or more, third plies of the reinforcing layer may be applied. The plurality of third plies may have the same, different or alternating winding directions. The plurality of third plies may be consolidated with the preceding ply. In so doing, each third ply may be consolidated individually or a plurality of, for example, two, three or more, third plies may be consolidated together, in particular by means of the third heating apparatus and/or in one step.

For example, two third plies of the reinforcing layer may be applied substantially simultaneously or, in particular directly or respectively immediately one after the other. The application may be carried out as described above and/or below. The application or respectively the winding/wrapping may be carried out in particular by means of a four-coil winding device, such as a taping machine. In so doing, the two third plies of the reinforcing layer may be applied in the same winding direction or in substantially opposite winding directions. The two third plies of the reinforcing layer may be applied immediately one after the other and then consolidated together in one step. In particular this may be done before further third plies are applied. At least the two third plies of the reinforcing layer may be brought to the third temperature during consolidation, which leads to an at least partial melting of the two third plies of the reinforcing layer, such that the two third plies of the reinforcing layer and the preceding ply of the reinforcing layer are rigidly interconnected, in particular in a fused manner. After the consolidation of the two third plies of the reinforcing layer, further third plies of the reinforcing layer may be applied and then consolidated accordingly. For example, after consolidation of the two third plies of the reinforcing layer, two further third plies of the reinforcing layer may be applied immediately one after the other and then consolidated together in a single step. Thereinafter, in turn, two further third plies of the reinforcing layer may be applied immediately one after the other and then consolidated together in one step. This allows a multi-layer reinforcing layer to be formed. For example, the reinforcing layer may have four, six, eight, ten or more plies, wherein the first two plies, which is to say, the first two radial inner plies, which correspond to the first and the second ply of the reinforcing layer described above and/or below and all subsequent plies may correspond to the third ply of the reinforcing layer. Alternatively, the first and/or second ply of the reinforcing layer described above and/or below may also be the last plies, which is to say, the radial outer plies, of the reinforcing layer, wherein the one or plurality of third plies of the reinforcing layer are applied and consolidated prior to the application of the first and/or second ply. The application and consolidation of the plies of the reinforcing layer can thus also be carried out in reverse order.

The method may comprise the step of: applying a sheathing to the at least one third ply of the reinforcing layer. The sheathing may be applied after consolidation of the at least one third ply of the reinforcing layer. The sheathing may be applied after consolidation of the last, which is to say, radial outer third ply of the reinforcing layer. The sheathing may be an outer pipe, for example, a flexible and/or bendable outer pipe, or a hose, for example, a flexible hose, or a film, for example, a flexible tubular film. The sheathing may be a plastic pipe or a plastics film. The sheathing can also be referred to as a "jacket." The sheathing may be or eventually be produced, for example, extruded, from thermoplastic material. The plastics may be or comprise polyolefin, polyethylene, high-density polyethylene (HDPE), polypropylene or polyamide. The sheathing may be or eventually be extruded, such as extruded onto. For example, the sheathing may be or may eventually be produced or extruded using an extruder or respectively a pipe head.

The method may comprise at least one cooling step for cooling the pipe, for example, after a consolidation. The cooling can take place after at least one consolidation. The cooling may take place directly and/or immediately after consolidation. The cooling can take place after the last ply of the reinforcing layer has been consolidated. The last ply of the reinforcing layer may be the last ply of the reinforcing layer to be applied. A cooling can take place, for example, after consolidation of the at least one third ply of the reinforcing layer. A cooling may take place after the consolidation of a pair of two third plies of the reinforcing layer. For example, a cooling may take place after each consolidation of a pair of two third plies of the reinforcing layer. Additionally or alternatively, a cooling can take place after application of the sheathing. The cooling may take place by means of a cooling apparatus. The cooling apparatus may be a water-cooling system and/or an air-cooling system. The cooling apparatus may be configured to generate both at least one stream of water as well as at least one stream of air. The at least one stream of water and the at least one stream of air may be generated simultaneously or one after the other. For example, a water cooling can take place first and then an air cooling. The stream of water may be applied substantially transversely and/or vertically to the pipe. The stream of air may be applied substantially in a direction transverse and/or opposite to the process direction or respectively direction of movement of the pipe. The pipe may be passed through the cooling apparatus.

After the cooling, the pipe or respectively composite pipe may be wound up. The winding up can take place on a drum device. The winding may be carried out by means of at least one pull-roll. The at least one pull-roll may be a belt puller.

A thermoplastic composite pipe may comprise a plastics pipe, such as an inner pipe and/or liner, and a reinforcing layer disposed around the plastics pipe. The thermoplastic composite pipe may be or may eventually be produced using the method described above and/or below. The thermoplastic composite pipe may be a flexible and/or bendable thermoplastic composite pipe.

A thermoplastic composite pipe may comprise a plastics pipe, as an inner pipe and/or liner, and a reinforcing layer disposed around the plastics pipe. The reinforcing layer may be rigidly interconnected, in particular in a fused manner and/or fused, to the plastics pipe. The thermoplastic composite pipe may be a flexible and/or bendable thermoplastic composite pipe. The reinforcing layer of the thermoplastic composite pipe may comprise a first ply, a second ply and at least a third ply. The first ply may comprise a first reinforcing belt, which is wound in a substantially spiral shape around the plastics pipe in a first spiral-shaped direction, as first winding direction, such that a plurality of axially spaced belt sections is formed, between which there are gaps or respectively splits, and a second reinforcing belt, which is wound in a substantially spiral shape around the plastics pipe in a first spiral-shaped direction, as first winding direction, such that a plurality of axially spaced belt sections is formed, which are arranged in the gaps or respectively splits of the first reinforcing belt of the first ply. The second ply may comprise a first reinforcing belt, which is wound in a substantially spiral shape around the first ply in a second spiral-shaped direction, as second winding direction, such that a plurality of axially spaced belt sections are formed, between which there are gaps or respectively splits, and a second reinforcing belt, which is wound in a substantially spiral shape around the first ply in the second spiral-shaped direction, as second winding direction, such that a plurality of axially spaced belt sections is formed, which sections are arranged in the gaps or respectively splits of the first reinforcing belt of the second ply. The at least one third ply may comprise a first reinforcing belt which is wound in a substantially spiral shape around the second ply in a third spiral-shaped direction, as third winding direction, and a second reinforcing belt which is wound in a substantially spiral shape around the second ply in the third spiral-shaped direction, as third winding direction, such that the second reinforcing belt of the third ply and the first reinforcing belt of the third ply overlap in sections. The thermoplastic composite pipe and/or its reinforcing layer or respectively the plies of the reinforcing layer may be configured and/or produced as described above and/or below.

A use of a thermoplastic composite pipe described above and/or below may be and/or serve for the transport of oil, such as crude oil or petroleum, gas, such as crude gas or natural gas, water, such as heating water, cooling water or drinking water, oil-water mixture, oil-gas mixture or other mixtures combined from the aforementioned substances/media.

An improved and/or more robust thermoplastic composite pipe for transporting different media can be provided using the invention. Notwithstanding its flexibility and pliability, the composite pipe can withstand high pressures and/or transport media over long distances.

BRIEF DESCRIPTION OF THE DRAWING

In the following, embodiment examples of the invention are described in more detail with reference to figures, wherein schematically and by way of example.

DETAILED DESCRIPTION

Figure 1:
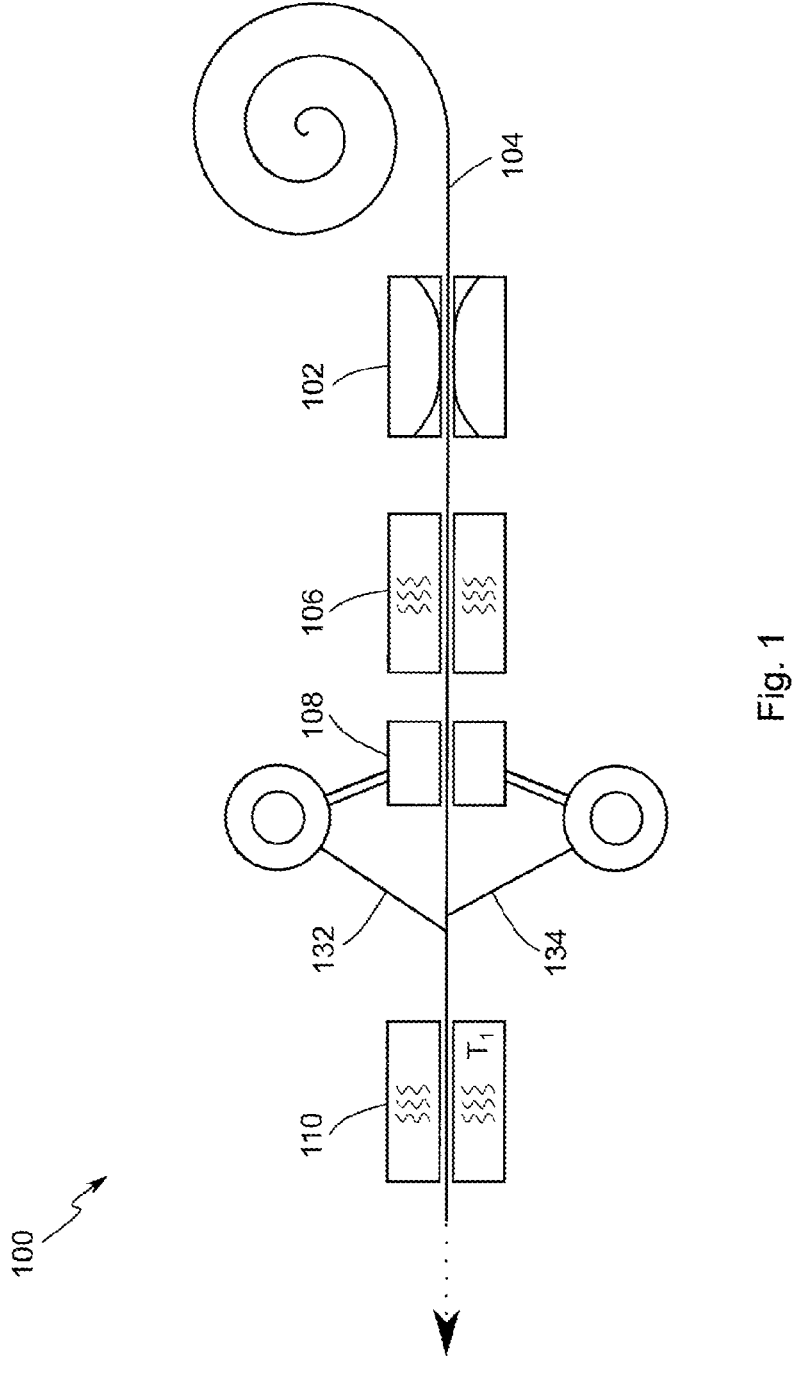
FIG. 1 shows a first section of a production line for producing a thermoplastic composite pipe.
Figure 2:
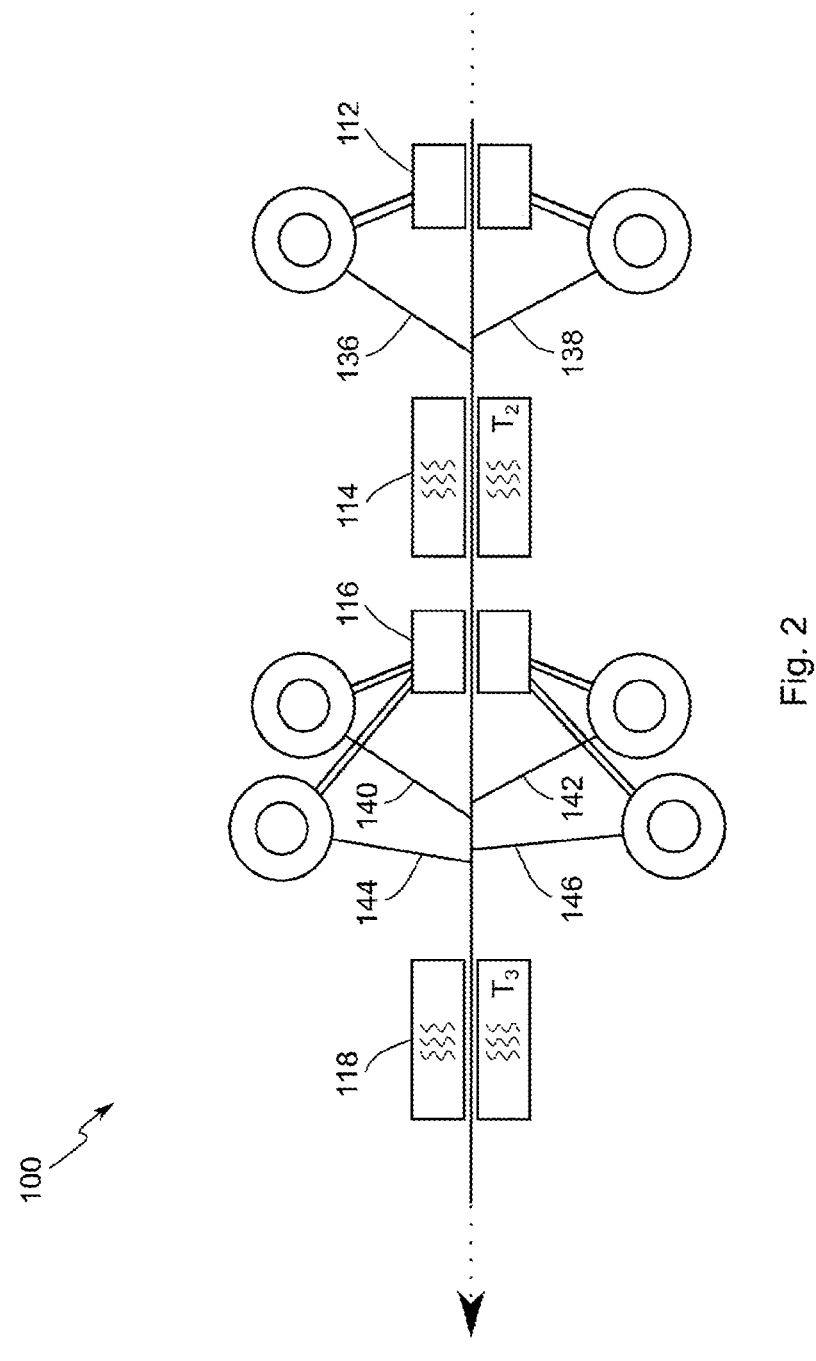
FIG. 2 shows a second section of the production line.
Figure 3:
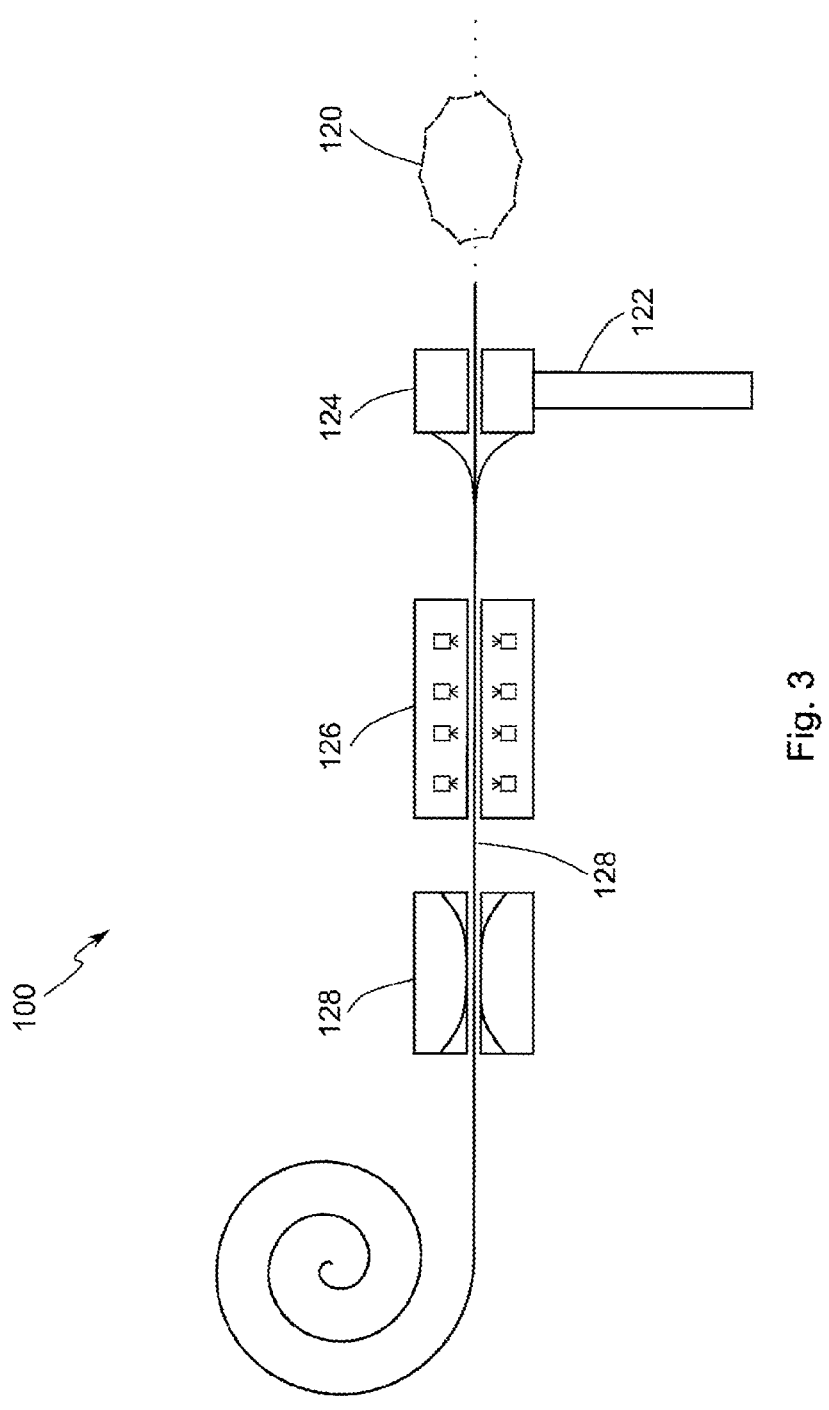
FIG. 3 shows a third section of the production line.

FIG. 1 through FIG. 3 respectively show sections of a production line 100. The production line 100 comprises a first belt puller 102 for unwinding a plastics pipe 104. The belt puller is arranged downstream of a pre-heating apparatus 106 for pre-heating the plastics pipe 104. The production line 100 further comprises a first two-coil winding device 108, such as a taping machine, which is arranged downstream of the pre-heating apparatus 106. A first heating apparatus 110 for consolidation, which is arranged downstream of the first winding device 108 is moreover provided. The production line 100 moreover comprises a second two-coil winding device 112, such as a taping machine, which is arranged downstream of the first heating apparatus 110. A second heating apparatus 114 for consolidation is provided downstream of the second winding device 112. The production line 100 moreover comprises a third four-coil winding device 116, which is arranged downstream of a third heating apparatus 118. The production line 100 may also comprise further third four-coil winding devices 116 and third heating apparatuses 118. This is schematically and generally referred to as optional additional apparatuses 120 or respectively shown in FIG. 3. The third heating apparatus 118 or respectively the optional additional apparatuses 120 is/are followed by an extrusion apparatus 122, such as an extruder, with a pipe head 124, which is configured to produce a sheath. A cooling apparatus 126 is provided downstream of the pipe head, which interfaces with a second belt puller 128 for winding up the manufactured composite pipe 130 onto a drum device.

The production line 100 may be used to carry out a method for producing a flexible, thermoplastic composite pipe 130. The plastics pipe 104 is provided by unwinding by means of the first belt puller 102, and is passed through the pre-heating apparatus 106 for pre-heating the plastics pipe 104. The plastics pipe 104 may be produced, in particular extruded, from thermoplastic material such as polyolefin, polyethylene, high density polyethylene (HDPE), polypropylene or polyamide.

In the method, a first ply of a reinforcing layer is applied to the plastics pipe 104 by means of the first winding device 108. The first ply of the reinforcing layer comprises a first reinforcing belt 132 and a second reinforcing belt 134. The first reinforcing belt 132 of the first ply of the reinforcing layer is wound around the plastics pipe 104 by the first winding device 108 in a substantially spiral shape in a first spiral-shaped direction, as first winding direction, such that a plurality of axially spaced belt sections is formed and gaps or respectively splits are formed between them. The second reinforcing belt 134 of the first ply of the reinforcing layer is wound around the plastics pipe 104 with the first winding device 108 in a substantially spiral shape in the first spiral-shaped direction, as first winding direction, such that a plurality of axially spaced belt sections is formed which are arranged in the gaps or respectively splits of the first reinforcing belt 132 of the first ply of the reinforcing layer. With the first two-coil winding device 108, the first rein-forcing belt 132 of the first ply of the reinforcing layer and the second reinforcing belt 134 of the first ply of the reinforcing layer are thereby wound around the plastics pipe 104 substantially simultaneously and, in particular immedi-ately one after the other as a monolayer application. In so doing, the first reinforcing belt 132 of the first ply of the reinforcing layer and the second reinforcing belt 134 of the first ply of the reinforcing layer are arranged directly adja-cent one to the other in the axial direction, in particular substantially edge to edge, and not overlapping.

The first ply of the reinforcing layer is then consolidated with the plastics pipe 104 by means of the first heating apparatus 110, wherein at least the first ply of the reinforcing layer is brought to a first temperature $T_1$, which leads to an at least partial melting of the first ply of the reinforcing layer, such that the first ply of the reinforcing layer and the plastics pipe 104 are rigidly interconnected, in particular in a fused manner.

A second ply of the reinforcing layer is then applied to the first ply of the reinforcing layer by means of the second winding device 112. The second ply of the reinforcing layer comprises a first reinforcing belt 136 and a second reinforc-ing belt 138. The first reinforcing belt 136 of the second ply of the reinforcing layer is wound around the first ply of the reinforcing layer by the second winding device 112 in a substantially spiral shape in a second spiral-shaped direc-tion, as second winding direction, such that a plurality of axially spaced belt sections is formed and gaps or respec-tively splits are formed between them. The second reinforc-ing belt 138 of the second ply of the reinforcing layer is wound around the first ply of the reinforcing layer with the second winding device 112 in a substantially spiral shape in the second spiral-shaped direction, as second winding direc-tion, such that a plurality of axially spaced belt sections is formed which are arranged in the gaps or respectively splits of the first reinforcing belt 136 of the second ply of the reinforcing layer. The second spiral-shaped direction or respectively second winding direction is substantially oppo-site to the first spiral-shaped direction or respectively first winding direction. With the second two-coil winding device 112, the first reinforcing belt 136 of the second ply of the reinforcing layer and the second reinforcing belt 138 of the second ply of the reinforcing layer are thereby wound around the plastics pipe 104 substantially simultaneously and, in particular immediately one after the other as a monolayer application on the first ply of the reinforcing layer. In so doing, the first reinforcing belt 136 of the second ply of the reinforcing layer and the second reinforcing belt 138 of the second ply of the reinforcing layer are arranged directly adjacent one to the other in the axial direction, in particular substantially edge to edge, and not overlapping.

The second ply of the reinforcing layer is then consoli-dated with at least the first ply of the reinforcing layer by means of the second heating apparatus 114, wherein at least the second ply of the reinforcing layer is brought to a second temperature $T_2$, which leads to an at least partial melting of the second ply of the reinforcing layer, such that the second ply of the reinforcing layer and the first ply of the reinforcing layer are rigidly interconnected, in particular in a fused manner. The first temperature $T_1$ and the second temperature $T_2$ may be substantially the same.

A first third ply of the reinforcing layer is then applied to the second ply of the reinforcing layer. The first third ply of the reinforcing layer comprises a first reinforcing belt 140 and a second reinforcing belt 142. The first reinforcing belt 140 of the first third ply of the reinforcing layer is wound around the second ply of the reinforcing layer by the third, four-coil winding device 116 in a substantially spiral shape in a third spiral-shaped direction, as third winding direction. The second reinforcing belt 142 of the first third ply of the reinforcing layer is wound around the second ply of the reinforcing layer with the third, four-coil winding device 116 in a substantially spiral shape in the third spiral-shaped direction, as the third winding direction, such that the second reinforcing belt 142 of the first third ply of the reinforcing layer and the first reinforcing belt 140 of the first third ply of the reinforcing layer overlap in sections. In so doing, the first reinforcing belt 140 of the first third ply of the rein-forcing layer and the second reinforcing belt 142 of the first third ply of the reinforcing layer may comprise or respec-tively form an overlapping area, which is arranged substan-tially over the seam of the first and/or of the second ply of the reinforcing layer. The overlap may amount to approxi-mately 10% to 70%, in particular approximately 40% to 60%, preferably approximately 50%, in particular the width of the belt. The first reinforcing belt 140 of the first third ply of the reinforcing layer and the second reinforcing belt 142 of the first third ply of the reinforcing layer are wound around the plastics pipe 104 substantially simultaneously and, in particular immediately, one after the other as a double layer application on the second ply of the reinforcing layer. In so doing, the third spiral-shaped direction or respectively the third winding direction can substantially correspond to the first spiral-shaped direction or respectively first winding direction or substantially correspond to the second spiral-shaped direction or respectively second winding direction.

Immediately after the first third ply of the reinforcing layer has been applied, in particular without prior consolidation, a second third ply of the reinforcing layer is applied to the first third ply of the reinforcing layer by means of the third, four-coil winding device 116. The second third ply of the reinforcing layer comprises a first reinforcing belt 144 and a second reinforcing belt 146. The first reinforcing belt 144 and the second reinforcing belt 146 of the second third ply of the reinforcing layer are applied in the same manner as the first reinforcing belt 140 and the second reinforcing belt 144 of the first third ply of the reinforcing layer. The winding directions of the first third ply of the reinforcing layer and the second third ply of the reinforcing layer may be the same or different, for example, opposite. Thereby, in the present embodiment example, two third plies of the reinforcing layer are applied by means of the four-coil winding device 116 substantially simultaneously and, in particular immediately, one after the other as a double layer application.

The first and the second third ply of the reinforcing layer or respectively the first and second reinforcing belt 140, 142 of the first third ply of the reinforcing layer and the first and second reinforcing belt 144, 146 of the second third ply of the reinforcing layer are then consolidated together with at least the second ply of the reinforcing layer in one step by means of the third heating apparatus 118, and in particular before further third plies are applied, for example, by means of the optional additional apparatuses 120. At least the two third plies of the reinforcing layer are thereby brought to a third temperature $T_3$, which leads to at least a partial melting of the two third plies of the reinforcing layer, such that the two third plies of the reinforcing layer and the preceding, here second, ply of the reinforcing layer are rigidly interconnected, in particular in a fused manner. In the present embodiment example, the third temperature $T_3$ is greater than the first temperature $T_1$ and greater than the second temperature $T_2$.

The reinforcing belts of the first, second and third plies of the reinforcing layer can respectively be a reinforcing belt, which is impregnated and/or coated with plastic such as polyolefin, polyethylene, high density polyethylene (HDPE), polypropylene or polyamide, in particular comprising unidirectionally arranged fibers such as glass fibers and/or plastic fibers and/or carbon fibers and/or aramid fibers.

Following the consolidation of the two third plies of the reinforcing layer, a sheathing is applied to the pipe or respectively to the second third ply of the reinforcing layer by means of the extrusion apparatus 122 and by means of the pipe head 124. Subsequently, the sheathed pipe is cooled by means of the cooling apparatus 126. The cooling apparatus 126 may be an air and/or water-cooling system. The produced thermoplastic composite pipe 130 is then wound onto a drum device by means of the second belt puller 128.

The term "may" refers in particular to optional features of the invention. Accordingly, there are also further developments and/or embodiment examples of the invention which additionally or alternatively have the respective feature or features.

Isolated features can also be selected as needed from the combinations of features disclosed herein and used in combination with other features to delimit the subject matter of the claim, eliminating any structural and/or functional connection that may exist between the features. The order and/or number of steps of the method may be varied and/or combined.

REFERENCE SIGNS

100 Production line
102 First belt puller
104 Plastics pipe
106 Pre-heating apparatus
108 First winding device
110 First heating apparatus
112 Second winding device
114 Second heating apparatus
116 Third winding device
118 Third heating apparatus
120 Optional additional apparatuses
122 Extrusion apparatus
124 Pipe head
126 Cooling apparatus
128 Second belt puller
130 Composite pipe
132 First reinforcing belt of the first ply
134 Second reinforcing belt of the first ply
136 First reinforcing belt of the second ply
138 Second reinforcing belt of the second ply
140 First reinforcing belt of the first third ply
142 Second reinforcing belt of the first third ply
144 First reinforcing belt of the second third ply
146 Second reinforcing belt of the second third ply
$T_1$ First temperature
$T_2$ Second temperature
$T_3$ Third temperature

The invention claimed is:

1. A method for producing a flexible thermoplastic composite pipe, comprising:

applying a first ply of a reinforcing layer onto a plastics pipe;

consolidating the first ply of the reinforcing layer with the plastics pipe, wherein at least the first ply of the reinforcing layer is brought to a first temperature which leads to at least partial melting of the first ply of the reinforcing layer, such that the first ply of the reinforcing layer and the plastics pipe are rigidly interconnected in a fused manner;

applying a second ply of the reinforcing layer onto the first ply of the reinforcing layer;

consolidating the second ply of the reinforcing layer with at least the first ply of the reinforcing layer, wherein at least the second ply of the reinforcing layer is brought to a second temperature which leads to at least partial melting of the second ply of the reinforcing layer, such that the second ply of the reinforcing layer and the first ply of the reinforcing layer are rigidly interconnected in a fused manner;

applying at least a third ply of the reinforcing layer onto the second ply of the reinforcing layer;

consolidating the at least one third ply of the reinforcing layer with at least the second ply of the reinforcing layer, wherein at least the third ply of the reinforcing layer is brought to a third temperature which leads to at least partial melting of the third ply of the reinforcing layer, such that the third ply of the reinforcing layer and the second ply of the reinforcing layer are rigidly interconnected in a fused manner, wherein the third temperature is greater than the first and/or second temperature.

2. The method according to claim 1, characterized in that the first temperature and the second temperature are substantially the same.

3. The method according to claim 1, characterized in that the first ply of the reinforcing layer comprises a first reinforcing belt which is wound around the plastics pipe in a substantially spiral shape in a first spiral-shaped direction, as first winding direction, such that a plurality of axially spaced belt sections and gaps or respectively splits between the sections are formed, and in that the first ply of the reinforcing layer comprises a second reinforcing belt which is wound substantially in a spiral shape in the first spiral-shaped direction, as first winding direction, around the plastics pipe such that a plurality of axially spaced belt sections is formed, which sections are arranged in the gaps or respectively splits of the first reinforcing belt of the first ply of the reinforcing layer.

4. The method according to claim 3, characterized in that the first reinforcing belt of the first ply of the reinforcing layer and the second reinforcing belt of the first ply of the reinforcing layer are wound around the plastics pipe substantially simultaneously or immediately one after the other, by means of a two-coil winding device, the two-coil winding device being a taping machine.

5. The method according to claim 3, characterized in that the first reinforcing belt of the first ply of the reinforcing layer and the second reinforcing belt of the first ply of the reinforcing layer are arranged in the axial direction, directly adjacent to one another, and/or not overlapping.

6. The method according to claim 3, characterized in that the first reinforcing belt of the first ply of the reinforcing layer and/or the second reinforcing belt of the first ply of the reinforcing layer and/or the first reinforcing belt of the second ply of the reinforcing layer and/or the second reinforcing belt of the second ply of the reinforcing layer and/or the first reinforcing belt of the third ply of the reinforcing layer and/or the second reinforcing belt of the third ply of the reinforcing layer is a reinforcing belt which is impregnated and/or coated with plastic being polyolefin, polyethylene, high density polyethylene (HDPE), polypropylene or polyamide, and comprising unidirectionally arranged fibers being glass fibers and/or plastic fibers and/or carbon fibers and/or aramid fibers.

7. The method according to claim 1, characterized in that the second ply of the reinforcing layer comprises a first reinforcing belt which is wound substantially in a spiral shape in a second spiral-shaped direction, as second winding direction, around the first ply of the reinforcing layer such that a plurality of axially spaced belt sections are formed, between which there are gaps or respectively splits, and in that the second ply of the reinforcing layer comprises a second reinforcing belt which is wound substantially in a spiral shape in the second spiral-shaped direction, as the second winding direction, around the first ply of the reinforcing layer such that a plurality of axially spaced belt sections of the second ply of the reinforcing layer are formed which are arranged in the gaps or respectively splits of the first reinforcing belt.

8. The method according to claim 7, characterized in that the first reinforcing belt of the second ply of the reinforcing layer and the second reinforcing belt of the second ply of the reinforcing layer are wound around the first ply of the reinforcing layer substantially simultaneously or immediately one after the other by means of a two-coil winding device, the two-coil winding device being a taping machine.

9. The method according to claim 7, characterized in that the first reinforcing belt of the second ply of the reinforcing layer and the second reinforcing belt of the second ply of the reinforcing layer are arranged in the axial direction, directly adjacent to one another, and/or not overlapping.

10. The method according to claim 7, characterized in that the second spiral-shaped direction or respectively second winding direction is substantially opposite to the first spiral-shaped direction or respectively first winding direction.

11. The method according to claim 1, characterized in that the third ply of the reinforcing layer comprises a first reinforcing belt which is wound substantially in a spiral shape in a third spiral-shaped direction, as third winding direction, around the second ply of the reinforcing layer, and in that the third ply of the reinforcing layer comprises a second reinforcing belt which is wound substantially in a spiral shape in the third spiral-shaped direction, as third winding direction, around the second ply of the reinforcing layer such that the second reinforcing belt of the third ply of the reinforcing layer and the first reinforcing belt of the third ply of the reinforcing layer overlap in sections.

12. The method according to claim 11, characterized in that the first reinforcing belt of the third ply of the reinforcing layer and the second reinforcing belt of the third ply of the reinforcing layer are wound around the second ply of the reinforcing layer substantially simultaneously or, immediately one after the other by means of a two-coil or four-coil winding device, the two-coil or four-coil winding device a taping machine.

13. The method according to claim 11, characterized in that the third spiral-shaped direction or respectively third winding direction substantially corresponds to the first spiral-shaped direction or respectively first winding direction or substantially corresponds to the second spiral-shaped direction or respectively second winding direction.

14. The method according to claim 11, characterized in that the first reinforcing belt of the third ply of the reinforcing layer and the second reinforcing belt of the third ply of the reinforcing layer comprise an overlapping area which is arranged substantially over the seam of the first and/or second ply of the reinforcing layer.

15. The method according to claim 11, characterized in that the overlap amounts to approximately 10% to 70% of the width of the belt, more specifically approximately 40% to 60% of the width of the belt.

16. The method according to claim 1, characterized in that the plastics pipe is or will be produced, by extrusion, from thermoplastic material being polyolefin, polyethylene, high-density polyethylene (HDPE), polypropylene or polyamide.

17. The method according to claim 1, characterized in that two third plies of the reinforcing layer are applied substantially simultaneously or, immediately one after the other, by means of a four-coil winding device, the four-coil winding device being a taping machine, and/or in that two third plies of the reinforcing layer are applied in the same winding direction or in substantially opposite winding directions.

18. The method according to claim 1, characterized in that two third plies of the reinforcing layer are applied immediately one after the other and then consolidated together in one step before further third plies are applied, wherein at least the two third plies of the reinforcing layer are brought to the third temperature, which leads to at least partial melting of the two third plies of the reinforcing layer, such that the two third plies of the reinforcing layer and the preceding ply of the reinforcing layer are rigidly interconnected in a fused manner.

19. The method according to claim 1, characterized in that after the consolidation of the at least one third ply of the reinforcing layer, a sheathing is applied by extrusion onto, and/or in that after at least one consolidation after the consolidation of the at least one third ply of the reinforcing layer, a cooling of the pipe, by means of a cooling apparatus, takes place.

20. A method for producing a flexible thermoplastic composite pipe, comprising:

applying a first ply of a reinforcing layer onto a plastic pipe;

first consolidating the first ply of the reinforcing layer with the plastic pipe, wherein the first consolidating comprises heating at least a portion of the first ply of the reinforcing layer is to a first temperature which leads to at least partial melting of the first ply of the reinforcing layer and a bonding of the first ply of the reinforcing layer to the plastic pipe;

applying a second ply of the reinforcing layer onto the first ply of the reinforcing layer;

second consolidating the second ply of the reinforcing layer with the first ply of the reinforcing layer, wherein the second consolidating comprises heating at least a portion of the second ply of the reinforcing layer to a second temperature which leads to at least partial melting of the second ply of the reinforcing layer and a bonding of the second ply of the reinforcing layer to the first ply of the reinforcing layer;

applying at least a third ply of the reinforcing layer onto the second ply of the reinforcing layer;

third consolidating the third ply of the reinforcing layer with the second ply of the reinforcing layer, wherein the third consolidating comprises heating at least a portion of the third ply of the reinforcing layer to a third temperature which leads to at least partial melting of the third ply of the reinforcing layer and a bonding of the third ply of the reinforcing layer to the second ply of the reinforcing layer;

wherein the third temperature is greater than the first and/or second temperature.

* * * * *